United States Patent
Hamamura et al.

(10) Patent No.: US 12,522,026 B2
(45) Date of Patent: Jan. 13, 2026

(54) PNEUMATIC TIRE

(71) Applicant: SUMITOMO RUBBER INDUSTRIES, LTD., Hyogo (JP)

(72) Inventors: Kenji Hamamura, Hyogo (JP); Hiroki Kawai, Hyogo (JP); Subaru Toya, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 32 days.

(21) Appl. No.: 18/022,646

(22) PCT Filed: Aug. 23, 2021

(86) PCT No.: PCT/JP2021/030856
§ 371 (c)(1),
(2) Date: Feb. 22, 2023

(87) PCT Pub. No.: WO2022/045078
PCT Pub. Date: Mar. 3, 2022

(65) Prior Publication Data
US 2023/0311586 A1   Oct. 5, 2023

(30) Foreign Application Priority Data
Aug. 28, 2020 (JP) .................... 2020-144438

(51) Int. Cl.
*B60C 15/06* (2006.01)
*B60C 11/03* (2006.01)

(52) U.S. Cl.
CPC ............ *B60C 15/06* (2013.01); *B60C 11/033* (2013.01); *B60C 2015/0614* (2013.01); *B60C 2200/04* (2013.01)

(58) Field of Classification Search
CPC ...... B60C 2001/005; B60C 2015/0614; B60C 15/0607; B60C 15/06
See application file for complete search history.

(56) References Cited

U.S. PATENT DOCUMENTS

| 2010/0032071 A1 | 2/2010 | Miyazaki |
| 2011/0094639 A1* | 4/2011 | Daisho ............... B60C 11/0302 152/209.5 |

(Continued)

FOREIGN PATENT DOCUMENTS

| EP | 1992506 | 11/2008 |
| EP | 3321107 | 5/2018 |

(Continued)

OTHER PUBLICATIONS

Written Opinion Issued in Corresponding EP Patent Application No. 21861503.7, dated Jan. 24, 2024.

(Continued)

*Primary Examiner* — Cedrick S Williams
(74) *Attorney, Agent, or Firm* — Greenblum & Bernstein, P.L.C.

(57) ABSTRACT

A pneumatic tire having a side portion and a clinch portion, wherein: in a meridian cross section, the distance from a bead baseline to the outside portion in the width direction of the clinch portion is greater than the distance to the inside portion in the width direction; the $E^*_S$ of the side portion, as measured at 70° C., a frequency of 10 Hz, an initial distortion of 5%, and a distortion rate of 1%, is less than the $E^*_C$ of the clinch portion; and, formulas (1) and (2) are satisfied:

$$1600 \leq (Dt^2 \times \pi/4)/Wt \leq 2827.4 \quad (1)$$

$$[(V+1.5\times10^7)/Wt] \leq 2.88\times10^5 \quad (2)$$

where Wt is the cross-sectional width of the tire installed on a standardized rim and filled with air to an internal pressure of 250 kPa, Dt is the outer diameter, and V is the volume of the tire.

18 Claims, 2 Drawing Sheets

(56) References Cited

U.S. PATENT DOCUMENTS

| | | | |
|---|---|---|---|
| 2012/0168052 A1 | 7/2012 | Ito | |
| 2014/0100316 A1* | 4/2014 | Washizu | C08F 12/08 526/337 |
| 2017/0274710 A1* | 9/2017 | Matsumoto | B60C 9/2204 |
| 2020/0032037 A1 | 1/2020 | Takano et al. | |

FOREIGN PATENT DOCUMENTS

| | | | |
|---|---|---|---|
| EP | 4177082 | 5/2023 | |
| JP | 07-137506 | 5/1995 | |
| JP | 2001-301424 | 10/2001 | |
| JP | 2010-058782 | 3/2010 | |
| JP | 2011-073511 | 4/2011 | |
| JP | 2011-148362 | 8/2011 | |
| JP | 2013-141963 | 7/2013 | |
| JP | 2015-160485 | 9/2015 | |
| JP | 2015160485 A * | 9/2015 | |
| JP | 2015199465 A * | 11/2015 | |
| JP | 2017-071359 | 4/2017 | |
| JP | 2017-206194 | 11/2017 | |
| JP | 2018-178034 | 11/2018 | |
| JP | 2019-089911 | 6/2019 | |
| JP | 2019-206643 | 12/2019 | |
| JP | 2020093681 A * | 6/2020 | |
| WO | 2011/033778 | 3/2011 | |
| WO | WO-2017074459 A1 * | 5/2017 | ......... B60C 11/0306 |
| WO | 2018/186367 | 10/2018 | |

OTHER PUBLICATIONS

Supplemental European Search Report Issued in Corresponding EP Patent Application. No. 21861503, dated Jan. 16, 2024.

International Search Report issued in International Pat. Appl. No. PCT/JP2021/030856, dated Nov. 2, 2021, along with an English translation thereof.

* cited by examiner ated under the conditions of 70° C., frequency of 10 Hz, initial strain of 5%, and dynamic strain rate of 1%. Here, each E* is a value measured using a viscoelasticity measuring device such as "Eplexor (registered trademark)" manufactured by GABO.

PNEUMATIC TIRE

TECHNICAL FIELD

The present disclosure relates to a pneumatic tire.

BACKGROUND ART

In recent years, from the viewpoint of increasing interest in environmental issues and economic efficiency, there has been a growing demand for fuel efficiency in automobiles, and there is a strong demand for improved fuel efficiency also in pneumatic tires (hereinafter, simply referred to as "tires") installed in automobiles.

The fuel efficiency of a tire can be evaluated by rolling resistance, and it is known that the smaller the rolling resistance, the better the fuel efficiency of the tire.

Therefore, conventionally, it has been proposed to reduce the rolling resistance by devising the formulation of the rubber composition constituting the tread portion of the tire (for example, Patent Documents 1 to 4).

PRIOR ART DOCUMENTS

Patent Document

[Patent Document 1] JP2018-178034A
[Patent Document 2] JP2019-089911A
[Patent Document 3] WO2018/186367A
[Patent Document 4] JP2019-206643A

SUMMARY OF INVENTION

Problem to be Solved by the Invention

However, although the tire manufactured by the conventional technology described above can reduce the rolling resistance, uneven wear tends to occur in the tread portion during high-speed running, and it cannot be said yet that the durability performance is sufficient.

Accordingly, an object of the present disclosure is to provide a pneumatic tire in which uneven wear of the tread portion is sufficiently suppressed during high-speed running and which has excellent durability performance.

Means for Solving the Problem

The present discloser has diligently studied the solution to the above-mentioned problem, found that the above-mentioned problem can be solved by the configuration described below.

The Present Disclosure is;
  a pneumatic tire having a side portion and a clinch portion, wherein,
  Ha>Hb, where, in the meridian cross section, the distance from the bead base line to the width direction outside portion of the clinch portion at the joint surface between the side portion and the clinch portion is Ha (mm), and the distance to the width direction inside portion is Hb (mm);
  $E^*_S < E^*_C$, where, measured under the conditions of 70° C., frequency of 10 Hz, initial strain of 5%, and dynamic strain rate of 1%, the complex elastic modulus of the side portion is $E^*_S$ (MPa), and the complex elastic modulus of the clinch portion is $E^*_C$ (MPa); and
  the tire satisfies following (formula 1) and (formula 2):

$$1600 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)},$$

where the cross-sectional width of the tire is Wt (mm), the outer diameter is Dt (mm), and the volume of the space occupied by the tire is the virtual volume V (mm³), when the tire is installed on a standardized rim and the internal pressure is 250 kPa.

The Effect of the Invention

According to the present disclosure, it is possible to provide a pneumatic tire in which uneven wear of the tread portion is sufficiently suppressed during high-speed running and which has excellent durability performance.

EMBODIMENTS FOR CARRYING OUT THE INVENTION

[1] Characteristics of the Tire of the Present Disclosure

First, the characteristics of the tire of the present disclosure will be described.

1. Overview

The tire of the present disclosure is a pneumatic tire having a side portion arranged on the side surface and a clinch portion arranged in a region of the bead portion in contact with the rim flange, and has the following characteristics.

First, the tire of the present disclosure is characterized in Ha>Hb, where, in the meridian cross section, the distance from the bead base line to the width direction outside portion of the clinch portion at the joint surface between the side portion and the clinch portion is Ha (mm), and the distance to the width direction inside portion is Hb (mm).

Next, the tire of the present disclosure is characterized in $E^*_S < E^*_C$, where the complex elastic modulus of the side portion is $E^*_S$ (MPa) and the complex elastic modulus of the clinch portion is $E^*_C$ (MPa), measured under the conditions of 70° C., frequency of 10 Hz, initial strain of 5%, and dynamic strain rate of 1%. Here, each E* is a value measured using a viscoelasticity measuring device such as "Eplexor (registered trademark)" manufactured by GABO.

Further, the tire according to the present disclosure is characterized also in satisfying following (formula 1) and (formula 2):

$$1600 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)}$$

where the cross-sectional width of the tire is Wt (mm), the outer diameter is Dt (mm), and the volume of the space occupied by the tire is the virtual volume V (mm³), when the tire is installed on a standardized rim and the internal pressure is 250 kPa (regular internal pressure in pneumatic tires for passenger cars).

Having these characteristics, it is possible to provide a pneumatic tire in which not only the rolling resistance is reduced, but also uneven wear of the tread portion during high-speed running is sufficiently suppressed, and the durability performance is excellent.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

Figure 2:
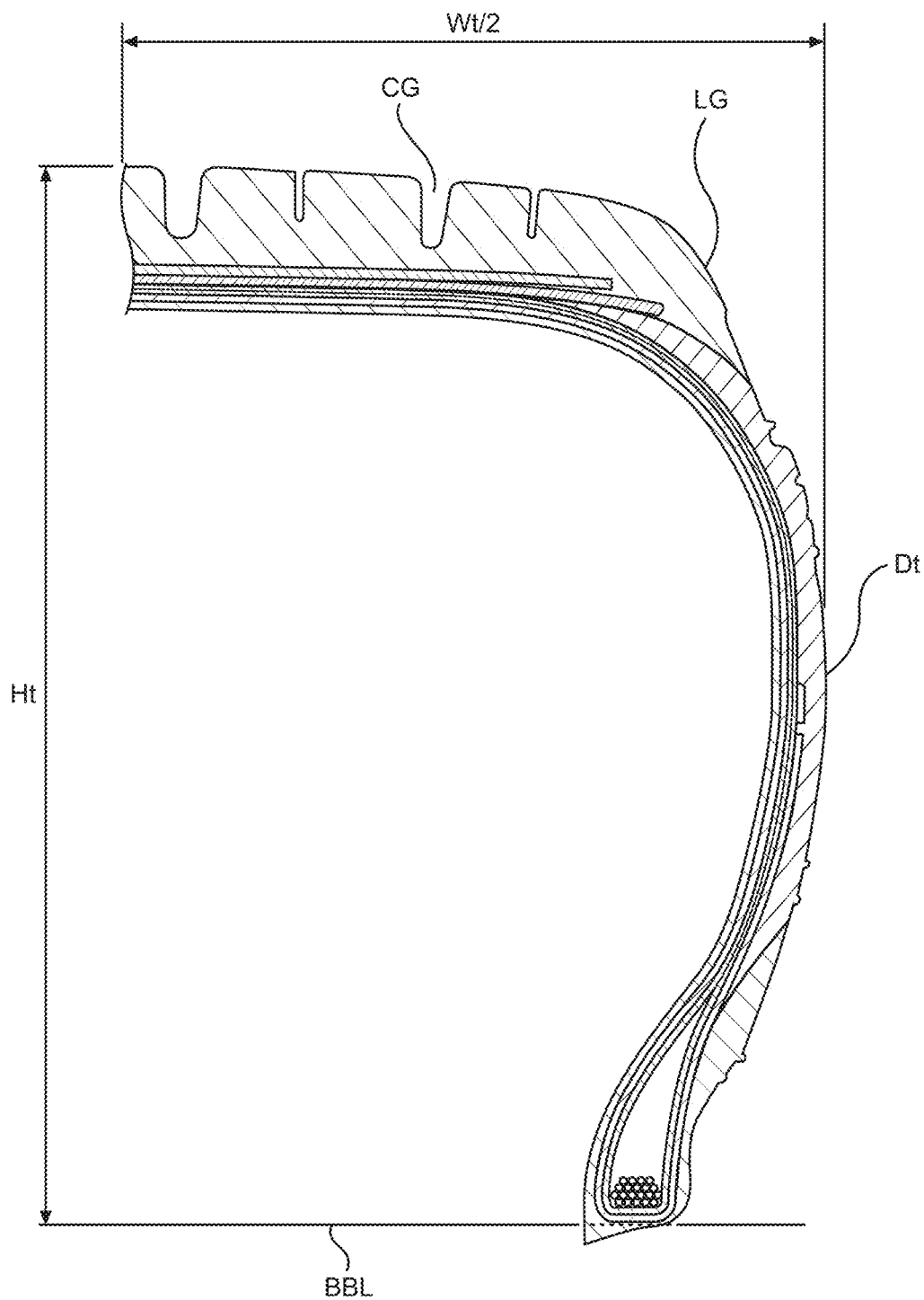
FIG. 2 is a meridian cross-sectional view of a pneumatic tire according to an embodiment of the present disclosure.

Further, as shown in FIG. 2, the outer diameter Dt of the tire is the outer diameter of the tire installed on a standardized rim, having an internal pressure of 250 kPa and in a no-load state. The cross-sectional width Wt (mm) of the tire is the width of tire installed on a standardized rim, having an internal pressure of 250 kPa and in a no-load state, and is the distance excluding patterns, letters, and the like on the tire side from the linear distance between the side walls (total width of the tire) including all the patterns, letters and the like on the tire side. Also, Ha and Hb are values measured for a tire installed on a standardized rim, with an internal pressure of 250 kPa and no load.

Further, the virtual volume V (mm$^3$) of the tire is, specifically, can be calculated by the following formula:

$$V=[(Dt/2)^2-\{(Dt/2)-Ht\}^2] \times \pi \times Wt$$

based on the outer diameter of tire Dt (mm), the tire cross-sectional height Ht (mm) (distance from the bottom of the bead to the outermost surface of the tread; ½ of the difference between the tire outer diameter and the nominal rim diameter), and the cross-sectional width of tire Wt (mm), in the state the tire is installed on a standardized rim, the internal pressure is 250 kPa and no load is applied.

In the above description, the "standardized internal pressure" is the air pressure specified for each tire by the above standards. For JATMA, it is the maximum air pressure, for TRA, it is the maximum value described in the table "TIRE LOAD LIMITS AT VARIOUS COLD INFLATION PRESSURES", and for ETRTO, it indicates "INFLATION PRESSURE". For example, it is "250 kPa" in the case of pneumatic tires for passenger cars.

2. Mechanism of Effect Manifestation in Tire According to the Present Disclosure The mechanism of effect manifestation in the tire according to the present disclosure, that is, the mechanism of not only reducing rolling resistance, but also sufficiently suppressing uneven wear of the tread portion during high-speed running, and further exhibiting excellent durability performance, is presumed as follows.

As described above, in the tire of the present disclosure, the cross-sectional width Wt (mm) and the outer diameter Dt (mm) of the tire are tried to satisfy $$1600 \leq (Dt^2 \times \pi/4)/Wt \leq 2827.4 \quad \text{(formula 1).}$$

By increasing the area when the tire is viewed from the lateral direction, $[(Dt/2)^2 \times \pi) = (Dt^2 \times \pi/4)]$, with respect to the cross-sectional width Wt of the tire, and satisfying the numerical range specified in (formula 1), it is considered that the repetition of deformation per unit time is reduced, as a result, the time that can be used for heat exchange is increased, thereby improving the heat release property of the side portion, and low rolling resistance and an improvement in durability can be achieved since the friction between the tread portion and the road surface can be reduced.

In (formula 1), it is more preferably 1700 or more, further preferably 1704 or more, further preferably 1731 or more, further preferably 1733 or more, further preferably 1737 or more, further preferably 1755 or more, further preferably 1758 or more, further preferably 1772 or more, further preferably 1781 or more, further preferably 1789 or more, further preferably 1805 or more, further preferably 1816 or more, further preferably 1822 or more, further preferably 1865 or more, further preferably 1870 or more, further preferably 1963.4 or more, further preferably 2014 or more, further preferably 2018 or more, further preferably 2021 or more, further preferably 2032 or more, further preferably 2045 or more, and further preferably 2107 or more.

However, such a tire has a large area when viewed from the lateral direction, that is, as the outer diameter Dt increases, the centrifugal force acting on the entire tread portion increases during high-speed running, partial non-uniformity in tire is promoted, and uneven wear tends to occur. Particularly, as the running speed increases, the centrifugal force also increases, and uneven wear is more likely to occur.

Therefore, in the tire of the present disclosure, the virtual volume V (mm$^3$) and the cross-sectional width Wt (mm) of the tire are tried to satisfy $$[(V+1.5 \times 10^7)/Wt] \leq 2.88 \times 10^5 \quad \text{(formula 2).}$$

In this way, it is considered that, by reducing the virtual volume V of the tire in accordance with the decrease in the cross-sectional width Wt of the tire, and reducing the volume of the tire itself, the growth of the outer diameter with increasing centrifugal force can be suppressed and the deformation of the tread portion can be reduced, while reducing the rolling resistance, and as a result, not only the heat generation can be reduced, but also the occurrence of uneven wear can be suppressed.

$[(V+1.5 \times 10^7)/Wt]$ is more preferably $2.87 \times 10^5$ or less, further preferably $2.85 \times 10^5$ or less, further preferably $2.77 \times 10^5$ or less, further preferably $2.61 \times 10^5$ or less, further preferably $2.55 \times 10^5$ or less, further preferably $2.50 \times 10^5$ or less, further preferably $2.49 \times 10^5$ or less, further preferably $2.42 \times 10^5$ or less, further preferably $2.27 \times 10^5$ or less, further preferably $2.24 \times 10^5$ or less, further preferably $2.21 \times 10^5$ or less, further preferably $2.19 \times 10^5$ or less, further preferably $2.18 \times 10^5$ or less, further preferably $2.17 \times 10^5$ or less, and further preferably $2.16 \times 10^5$ or less.

At this time, it is more preferable that $[(V+2.0 \times 10^7)/Wt] \leq 2.88 \times 10^5$ (formula 3). The above $[(V+2.0 \times 10^7)/Wt]$ is more preferably $2.83 \times 10^5$ or less, further preferably $2.80 \times 10^5$ or less, further preferably $2.77 \times 10^5$ or less, further preferably $2.76 \times 10^5$ or less, further preferably $2.64 \times 10^5$ or less, further preferably $2.50 \times 10^5$ or less, further preferably $2.49 \times 10^5$ or less, further preferably $2.47 \times 10^5$ or less, further preferably $2.46 \times 10^5$ or less, further preferably $2.44 \times 10^5$ or less, and further preferably $2.41 \times 10^5$ or less.

Further, it is more preferable that $[(V+2.5 \times 10^7)/Wt] \leq 2.88 \times 10^5$ (formula 4). The above $[(V+2.5 \times 10^7)/Wt]$ is further preferably $2.85 \times 10^5$ or less, further preferably $2.78 \times 10^5$ or less, further preferably $2.75 \times 10^5$ or less, further preferably $2.71 \times 10^5$ or less, further preferably $2.69 \times 10^5$ or less, further preferably $2.68 \times 10^5$ or less, and further preferably $2.66 \times 10^5$ or less.

Further, in the tire of the present disclosure, the clinch portion and the side portion are joined so that Ha>Hb, and $E^*_S<E^*_C$ is satisfied so that the stiffness of the clinch portion is higher than that of the side portion. As a result, it is considered that the load applied to the interface between the clinch portion and the side portion can be reduced during high-speed running, and uneven wear during high-speed running can be further suppressed. At this time, if the end of the side portion is covered with the end of the clinch portion, the effect of further suppressing the occurrence of uneven wear during high-speed running is exhibited more remarkably, which is preferable.

In the above, the specific difference between Ha and Hb, (Ha−Hb), is preferably 12 mm or more, more preferably 22 mm or more, further preferably 23 mm or more, and further preferably 35 mm or more. Further, the specific difference between $E^*_C$ and $E^*_S$, ($E^*_C-E^*_S$), is preferably 2.1 MPa or more, more preferably 2.7 MPa or more, further preferably 3.7 MPa or more and further preferably 4.3 MPa or more.

[2] A More Preferred Embodiment of the Tire of the Present Disclosure

The tire of the present disclosure can obtain even greater effects by adopting the following embodiments.

1. Aspect Ratio

The tire according to the present disclosure is preferably a tire having an aspect ratio of 40% or more, so that the height of the side portion of the tire can be increased and the area of the side portion can be increased, and it is possible to further improve the heat dissipation of the entire tire by reducing the contribution of heat generation in the tread portion. As a result, it is possible to sufficiently suppress the decrease in rigidity in the tread portion and the side portions, and further suppress the occurrence of uneven wear during high-speed running.

The aspect ratio (%) described above can be obtained by the following formula using the cross-sectional height Ht (mm) and the cross-sectional width Wt (mm) of the tire when the internal pressure is 250 kPa.

$$(Ht/Wt) \times 100 (\%)$$

The aspect ratio is more preferably 41% or more, more preferably 45% or more, further preferably 47.5% or more, further preferably 49% or more, further preferably 50% or more, further preferably 52.5% or more, further preferably 53% or more, further preferably 55% or more, and further preferably 58% or more. There is no particular upper limit, but for example, it is 100% or less.

2. Relationship Between $E^*_S$ (MPa), $E^*_C$ (MPa) and Wt (Mm)

It is assumed that as the cross-sectional width Wt increases, the difference between the contact pressure at the tread center portion and the contact pressure at the tread shoulder portion tends to increase, and uneven wear tends to occur. On the other hand, when the complex elastic modulus $E^*_C$ of the clinch portion is made larger than the complex elastic modulus $E^*_S$ of the side portion, the clinch portion with high rigidity can hold down the side portion with low rigidity, and it is considered preferable for suppressing the occurrence of uneven wear.

Considering that uneven wear can be suppressed by increasing the difference in the complex elastic modulus between the clinch portion and the side portion, that is, $E^*_C-E^*_S$, as the cross-sectional width Wt increases, the relationship between $E^*_C-E^*_S$ (MPa) and Wt (mm) was examined. As a result, it was found that if ($E^*_C-E^*_S$)/Wt>$0.04 \times 10^{-1}$ (formula 5) is satisfied, uneven wear can be effectively suppressed, which is preferable.

The above ($E^*_C-E^*_S$)/Wt is more preferably $0.08 \times 10^{-1}$ or more, further preferably $0.09 \times 10^{-1}$ or more, further preferably more than $0.10 \times 10^{-1}$ preferably, further preferably $0.11 \times 10^{-1}$ or more, further preferably $0.12 \times 10^{-1}$ or more, further preferably $0.13 \times 10^{-1}$ or more, further preferably $0.14 \times 10^{-1}$ or more, further preferably more than $0.15 \times 10^{-1}$, further preferably $0.16 \times 10^{-1}$ or more, further preferably $0.18 \times 10^{-1}$ or more, further preferably $0.21 \times 10^{-1}$ or more, and further preferably $0.24 \times 10^{-1}$ or more.

3. Relationship Between Ha (Mm), Hb (Mm) and Wt (Mm)

As described above, as the cross-sectional width Wt increases, the difference between the contact pressure at the tread center portion and the contact pressure at the tread shoulder portion tends to increase, and it is assumed that uneven wear tends to occur. On the other hand, when Hb is larger than Ha, as described above, it is considered that the load applied to the interface between the clinch portion and the side portion is reduced during high-speed running, thereby further suppressing uneven wear during high-speed running. When the end of the side portion is covered with the end of the clinch portion, the side portion can be pressed down over a wide range by the clinch portion, and as a result, it is considered that the effect of suppressing occurrence of uneven wear during high-speed running can be exhibited more remarkably.

Therefore, the inventors considered that uneven wear can be suppressed by increasing Ha−Hb as the cross-sectional width Wt increases, and have studied the relationship between Ha, Hb and Wt. As a result, it was found that if (Ha−Hb)/Wt>0.04 (formula 7) is satisfied, uneven wear can be effectively suppressed, which is preferable.

It turned out that the above (Ha−Hb)/Wt is more preferably 0.05 or more, further preferably 0.06 or more, further preferably 0.09 or more, further preferably more than 0.10, further preferably 0.11 or more, further preferably 0.12 or more, further preferably more than 0.15, further preferably 0.17 or more, and further preferably 0.20 or more.

In addition, in the tire of the present disclosure, the ratio of Ha and Hb to Ht is preferably 5% or more and 80% or less. And, $E^*_C$ is preferably 6.1 MPa or more and 8.3 MPa or less from a comprehensive viewpoint of uneven wear resistance performance and durability performance. $E^*_S$ is preferably 2 MPa or more and 5 MPa or less, more preferably 4 MPa or less, and further preferably 3.5 MPa or less.

4. Loss Tangent of Side Portion (Tan δ)

In the tire of the present disclosure, the loss tangent (tan δ) of the side portion measured under the conditions of 70° C., frequency of 10 Hz, initial strain of 5% and dynamic strain rate of 1% is preferably 0.095 or less, more preferably 0.090 or less, further preferably 0.085 or less, further preferably 0.080 or less, further preferably 0.075 or less, further preferably 0.070 or less, and most preferably 0.065 or less. As a result, it is considered that the heat release property of the side portion can be further improved while the heat generation property of the side portion can be reduced.

The measurement of tan δ is carried out on a piece of rubber cut from at least radially outside the groove bottom of the tire, preferably radially outside half the depth of the deepest circumferential groove. Specifically, for example, it can be measured using a viscoelasticity measuring device of "Eplexor (registered trademark)" manufactured by GABO. Also, this tan δ can be measured simultaneously with the measurement of E* described above.

Then, when the thickness of the side portion measured at the maximum width position is Ts (mm), (tan δ×Ts) is preferably 0.40 or more, more preferably 0.45 or more, and further preferably 0.50 or more.

By controlling tan δ and Ts in this way, it is considered possible to appropriately control heat generation in the side portions. A specific Ts is, for example, 1 to 20 mm.

5. Tread Groove

The tire according to the present disclosure has a circumferential groove continuously extending in the tire circumferential direction in the tread portion. The ratio of the groove width $L_{80}$ at a depth of 80% of the maximum depth of the circumferential groove to the groove width $L_0$ of the circumferential groove on the ground contact surface of the tread portion ($L_{80}/L_0$) is preferably 0.3 to 0.7. As a result, it is possible to suppress the movement of the entire land portion on the bottom surface of the land portion of the tread portion, thereby sufficiently suppressing uneven wear of the tread portion and improving the durability during high-speed running. The ratio is more preferably 0.35 to 0.65, further preferably 0.40 to 0.60, and particularly preferably 0.45 to 0.55.

The above-mentioned $L_0$ and $L_{80}$ refer to the linear distance ($L_0$) between the groove edges on the tread surface of the tread circumferential groove of a tire, and to the minimum distance ($L_{80}$) between the groove walls at a position where the groove depth is 80%, respectively, in a state where the tire is installed on a standardized rim, the internal pressure is 250 kPa, and no load is applied. To put it simply, they can be obtained by putting the bead portion of the section cut out in the radial direction with a width of 2 to 4 cm in a pressed state according to the rim width.

It is preferable that a plurality of circumferential grooves is formed in the tread portion, and the total cross-sectional area of the plurality of circumferential grooves is 10 to 30% of the cross-sectional area of the tread portion. It is considered that this makes it possible to suppress the movement of the tread portion, and uneven wear of the tread portion during high-speed running can be suppressed and the durability can be improved. It is more preferably 15 to 27%, further preferably 18 to 25%, and particularly preferably 21 to 23%.

The cross-sectional area of the circumferential groove refers to the total value of the area composed of a straight line connecting the ends of the tread circumferential groove and a groove wall in a tire installed on a standardized rim, having an internal pressure of 250 kPa and in a no-load state. To put it simply, they can be obtained by putting the bead portion of the section cut out in the radial direction with a width of 2 to 4 cm in a pressed state according to the rim width. The circumferential grooves may be grooves extending continuously in the tire circumferential direction, and non-linear grooves such as zigzag grooves and wavy grooves are also included in the circumferential grooves.

Further, it is preferable that a plurality of lateral grooves extending in the tire axial direction is formed in the tread portion, and the total volume of the plurality of lateral grooves is 2.0 to 5.0% of the volume of the tread portion. It is considered that this makes it possible to suppress the movement of the tread portion, suppress the uneven wear, and improve the durability. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the portion excluding the lateral groove from the section and multiplying it by the outer diameter, then obtaining the difference between the calculation result and the volume of the lateral groove.

In order to suppress uneven wear of the tread portion and further improve the durability, it is preferred that these lateral grooves include a lateral groove having (Gw/Gd), i.e. ratio of groove width Gw to groove depth Gd, of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

4. Tire Shape

In the tire of the present disclosure, when the tire is installed on a standardized rim and the internal pressure is 250 kPa, the specific outer diameter Dt (mm) is preferably, for example, 515 mm or more, more preferably 558 mm or more, further preferably 585 mm or more, further preferably 648 mm or more, further preferably 658 mm or more, further preferably 662 mm or more, further preferably 664 mm or more, further preferably 665 mm or more, further preferably 671 mm or more, and most preferably 673 mm or more.

On the other hand, it is preferably less than 843 mm, more preferably 735 mm or less, further preferably less than 725 mm, further preferably 719 mm or less, further preferably 717 mm or less, further preferably 716 mm or less, further preferably 714 mm or less, further preferably 711 mm or less, further preferably less than 707 mm, further preferably 691 mm or less, further preferably 690 mm or less, further preferably 685 mm or less, further preferably less than 685 mm, further preferably 680 mm or less, and further preferably 675 mm or less.

The specific cross-sectional width Wt (mm) is preferably 115 mm or more, more preferably 130 mm or more, further preferably 150 mm or more, further preferably 170 mm or more, further preferably 174 mm or more, further preferably 175 mm or more, further preferably 176 mm or more, further preferably 178 mm or more, further preferably 181 mm or more, further preferably 183 mm or more, and particularly preferably 185 mm, and most preferably 193 mm or more.

On the other hand, it is preferably less than 305 mm, more preferably less than 245 mm, further preferably 235 mm or less, further preferably 231 mm or less, further preferably 230 mm or less, further preferably 229 mm or less, further preferably 228 mm or less, further preferably 224 mm or less, further preferably less than 210 mm, further preferably less than 205 mm, further preferably 203 mm or less, further preferably 202 mm or less, further preferably 200 mm or less, and further preferably less than 200 mm.

The specific cross-sectional height Ht (mm) is, for example, preferably 37 mm or more, more preferably 69 mm or more, further preferably 70 mm or more, further preferably 71 mm or more, further preferably 77 mm or more, further preferably 78 mm or more, further preferably 79 mm or more, further preferably 80 mm or more, further preferably 87 mm or more, further preferably 89 mm or more, further preferably 90 mm or more, further preferably 95 mm or more, further preferably 96 mm or more, further preferably 98 mm or more, and further preferably 99 mm or more.

On the other hand, it is preferably less than 180 mm, more preferably 116 mm or less, further preferably 114 mm or less, further preferably less than 112 mm, further preferably 104 mm or less, further preferably 101 mm or less, and further preferably less than 101 mm.

The specific virtual volume V is preferably 13,000,000 mm$^3$ or more, more preferably 22,647,919 mm$^3$ or more, further preferably 23,279,803 mm$^3$ or more, further preferably 23,518,082 mm$^3$ or more, further preferably 28,585,634 mm$^3$ or more, further preferably 28,719,183 mm$^3$ or more, further preferably 29,000,000 mm$^3$ or more further preferably 29,087,378 mm$^3$ or more, further preferably 30,132,749 mm$^3$ or more, further preferably 30,349,719 mm$^3$ or more, further preferably 34,192,251 mm$^3$ or more, further preferably 35,836,776 mm$^3$ or more, further preferably 36,000,000 mm$^3$ or more, further preferably 36,203,610 mm$^3$ or more, further preferably 36,418,787 mm$^3$ or more, further preferably 36,616,393 mm$^3$ or more, and further preferably 36,682,357 mm$^3$ or more.

On the other hand, it is preferably less than 66,000,000 mm$^3$, more preferably 52,265,389 mm$^3$ or less, further preferably less than 44,000,000 mm$^3$, further preferably 43,355,989 mm$^3$ or less, further preferably 41,835,961 mm$^3$ or less, further preferably 40,755,756 mm$^3$ or less, and further preferably less than 38,800,000 mm$^3$.

Further, in the tire of the present disclosure, considering the stability of the riding comfort during traveling, (Dt−2×Ht) is preferably 450 mm or more, more preferably 456 mm or more, further preferably 458 mm or more, further preferably 470 mm or more, further preferably 480 mm or more, further preferably 482 mm or more, further preferably 483 mm or more, and further preferably 484 mm or more.

On the other hand, considering the deformation of the tread portion, it is preferably less than 560 mm, more preferably 559 mm or less, further preferably 558 mm or less, further preferably 534 mm or less, further preferably 533 mm or less, further preferably less than 530 mm, further preferably less than 510 mm, further preferably 509 mm or less, further preferably 508 mm or less, and further preferably 507 mm or less.

[3] Specific Embodiments of the Present Disclosure

Hereinafter, the present disclosure will be specifically described based on the embodiments.

1. Tire Shape

Figure 1:
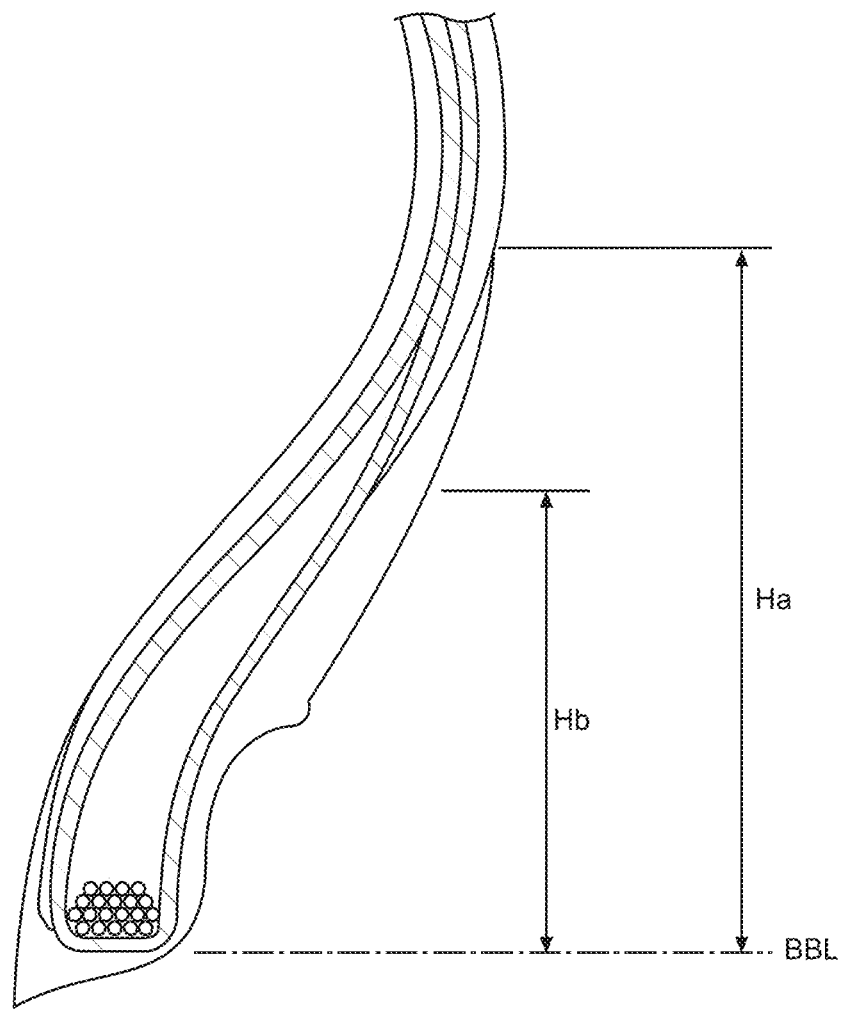
FIG. 1 is a partial meridian cross-sectional view of a pneumatic tire according to an embodiment of the present disclosure.

FIG. 1 is a partial meridian cross-sectional view of a tire according to an embodiment of the present disclosure. In FIG. 1, 1 is a tire, 2 is a side portion, 3 is a clinch portion, 4 is a bead core, 5 is a carcass ply, 6 is a bead apex, and 7 is an inner liner. Ha is the distance (mm) from the bead baseline to the width direction outside portion of the clinch portion 3 at the joint surface between the side portion 2 and the clinch portion 3, and Hb is the distance (mm) to the width direction inside portion of the clinch portion 3. The side portion 2 is joined to a tread portion (not shown).

As shown in FIG. 1, in the tire according to the present embodiment, the end portion of the clinch portion 3 is overlapped with the end portion of the side portion 2 and the clinch portion 3 is spliced to the side portion 2, so as to satisfy Ha>Hb. In addition, although the end of the side portion is covered with the end of the clinch portion in FIG. 1, the present disclosure is not limited to the form shown in this FIGURE.

In the present embodiment, the complex elastic modulus E*$_S$ (MPa) of the side portion 2 measured under conditions of a temperature of 70° C., a frequency of 10 Hz, an initial strain of 5%, and a dynamic strain rate of 1% is less than the complex elastic modulus E*$_C$ (MPa) of the clinch portion 3.

In the present embodiment, when the cross-sectional width is Wt (mm), the outer diameter is Dt (mm), and the volume of the space occupied by the tire is the virtual volume V (mm$^3$), when the tire is installed on a standardized rim and the internal pressure is 250 kPa, the following (formula 1) and (formula 2) are satisfied.

$$1600 \leq (Dt^2 \times \pi/4)/Wt \leq 2827.4 \quad \text{(formula 1)}$$

$$[(V+1.5 \times 10^7)/Wt] \leq 2.88 \times 10^5 \quad \text{(formula 2)}$$

By configuring the tire according to the present embodiment in this way, it is possible to sufficiently suppress uneven wear of the tread portion during high-speed running, and to provide a pneumatic tire having excellent durability performance.

2. Rubber Composition

The side portion, the clinch portion, and the tread portion, which are the main members constituting the tire according to the present embodiment, are each made of a rubber composition (rubber composition for the side portion, rubber composition for clinch portion, rubber composition for tread portion).

(1) Rubber Composition for the Side Portion, and Rubber Composition for Clinch Portion In the present embodiment, the rubber composition for the side portion and the rubber composition for the clinch portion is prepared by compounding various compounding materials such as the rubber component, filler, softening agent, vulcanizing agent and vulcanization accelerator described below, and can be easily obtained by appropriately adjusting the type and amount of the compounding materials, particularly the filler and the softening agent, to obtain physical properties corresponding to each.

(a) Rubber Component

As the rubber component for each rubber composition, rubber (polymer) generally used for producing tires such as butadiene rubber (BR), styrene-butadiene rubber (SBR), isoprene-based rubber, and nitrile rubber (NBR) can be used. Among these, it is preferable to use butadiene rubber (BR) and isoprene-based rubber.

(a-1) BR

In each rubber composition, the content of BR in 100 parts by mass of the rubber component is preferably 40 parts by mass or more, more preferably 50 parts by mass or more, and even more preferably 55 parts by mass or more. On the other hand, the content is preferably 75 parts by mass or less, more preferably 70 parts by mass or less, and even more preferably 65 parts by mass or less.

The weight average molecular weight of BR is, for example, more than 100,000 and less than 2 million. The vinyl bond amount of BR is, for example, more than 1% by mass and less than 30% by mass. The cis content of BR is, for example, more than 1% by mass and less than 98% by mass. The trans amount of BR is, for example, more than 1% by mass and less than 60% by mass. The cis content can be measured by infrared absorption spectrometry.

BR is not particularly limited, and BR with high cis content (90% or more of cis content), BR with low cis content, BR containing syndiotactic polybutadiene crystals, and the like can be used. Among them, high-cis BR is preferable. Hi-cis BR is a butadiene rubber having a cis content of 90% by mass or more.

BR may be either non-modified BR or modified BR. As modified BR, for example, BR modified with a compound (modifying agent) represented by the following formula can be used.

[Chemical 1]

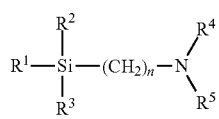

In the formula, $R^1$, $R^2$ and $R^3$ represent, the same or different, alkyl group, alkoxy group, silyloxy group, acetal group, carboxyl group (—COOH), mercapto group (—SH) or derivatives thereof. $R^4$ and $R^5$ represent, the same or different, hydrogen atoms or alkyl groups. $R^4$ and $R^5$ may be combined to form a ring structure with nitrogen atoms. n represents an integer.

As the modified BR modified with the compound (modifier) represented by the above formula, a BR whose polymer terminal (active terminal) has been modified with the compound represented by the above formula can be mentioned.

As $R^1$, $R^2$ and $R^3$, an alkoxy group is preferable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is preferable. n is preferably 1 to 5, more preferably 2 to 4, and even more preferably 3. Further, when $R^4$ and $R^5$ are bonded to form a ring structure together with a nitrogen atom, a 4- to 8-membered ring is preferable. The alkoxy group also includes a cycloalkoxy group (for example, cyclohexyloxy group) and an aryloxy group (for example, phenoxy group, benzyloxy group).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified BR, a modified BR modified with the following compound (modifying agent) can also be used. Examples of the modifying agent include
polyglycidyl ethers of polyhydric alcohols such as ethylene glycol diglycidyl ether, glycerin triglycidyl ether, trimethylolethanetriglycidyl ether, and trimethylolpropane triglycidyl ether;
polyglycidyl ethers of aromatic compounds having two or more phenol groups such as deglycosylated bisphenol A;
polyepoxy compounds such as 1,4-diglycidylbenzene, 1,3,5-triglycidylbenzene, and polyepoxidized liquid polybutadiene;
epoxy group-containing tertiary amines such as 4,4'-diglycidyl-diphenylmethylamine, and 4,4'-diglycidyl-dibenzylmethylamine;
diglycidylamino compounds such as diglycidylaniline, N,N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;
amino group-containing acid chlorides such as bis-(1-methylpropyl) carbamate chloride, 4-morpholincarbonyl chloride, 1-pyrrolidincarbonyl chloride, N,N-dimethylcarbamide acid chloride, and N,N-diethylcarbamide acid chloride;
epoxy group-containing silane compounds such as 1,3-bis-(glycidyloxypropyl)-tetramethyldisiloxane, and (3-glycidyloxypropyl)-pentamethyldisiloxane;
sulfide group-containing silane compound such as (trimethylsilyl) [3-(trimethoxysilyl) propyl]sulfide, (trimethylsilyl) [3-(triethoxysilyl) propyl]sulfide, (trimethylsilyl) [3-(tripropoxysilyl) propyl]sulfide, (trimethylsilyl) [3-(tributoxysilyl) propyl]sulfide, (trimethylsilyl) [3-(methyldimethoxysilyl) propyl]sulfide, (trimethylsilyl) [3-(methyldiethoxysilyl) propyl]sulfide, (trimethylsilyl) [3-(methyldipropoxysilyl) propyl]sulfide, and (trimethylsilyl) [3-(methyldibutoxysilyl) propyl]sulfide;
N-substituted aziridine compound such as ethyleneimine and propyleneimine;
alkoxysilanes such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, and N,N-bis (trimethylsilyl) aminoethyltriethoxysilane;
(thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis(diethylamino) benzophenone, 4,4'-bis (diphenylamino) benzophenone, and N, N,N',N'-bis-(tetraethylamino) benzophenone;
benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;
N-substituted pyrolidone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;
N-substituted piperidone such as methyl-2-piperidone, N-vinyl-2-piperidone, and N-phenyl-2-piperidone;
N-substituted lactams such as N-methyl-ε-caprolactam, N-phenyl-ε-caprolactum, N-methyl-ω-lauryllactam, N-vinyl-ω-lauryllactam, N-methyl-ß-propiolactam, and N-phenyl-ß-propiolactam; and
N,N-bis-(2,3-epoxypropoxy)-aniline, 4,4-methylene-bis-(N, N-glycidylaniline), tris-(2,3-epoxypropyl)-1,3,5-triazine-2,4,6-triones, N,N-diethylacetamide, N-methylmaleimide, N,N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis (methylethylamino)-4-heptanone.

The modification with the above compound (modifying agent) can be carried out by a known method. These modified BRs may be used alone or in combination of two or more.

As BR, for example, products of Ube Industries, Ltd., JSR Corporation, Asahi Kasei Co., Ltd., Nippon Zeon Co., Ltd., etc. can be used.

(a-2) Isoprene Rubber

In each rubber composition, the content (total content) of the isoprene-based rubber in 100 parts by mass of the rubber component is preferably 25 parts by mass or more, more preferably 30 parts by mass or more, and further preferably 35 parts by mass or more. On the other hand, it is preferably 55 parts by mass or less, more preferably 50 parts by mass or less, and further preferably 45 parts by mass or less.

Examples of the isoprene-based rubber include natural rubber (NR), isoprene rubber (IR), reformed NR, modified NR, and modified IR. Among them, NR is preferable from the viewpoint of excellent strength.

As the NR, for example, SIR20, RSS #3, TSR20 and the like, which are common in the tire industry, can be used. The IR is not particularly limited, and for example, IR 2200 manufactured by Nippon Zeon Co., Ltd. and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(a-3) Other Rubber Components

Further, as another rubber component, the rubber composition may contain a rubber (polymer) generally used in the production of tires, such as styrene-butadiene rubber (SBR) and nitrile rubber (NBR).

(b) Compounding Materials Other than Rubber Components (b-1) Carbon Black

Each rubber composition preferably contains carbon black as a reinforcing agent. The content of carbon black with respect to 100 parts by mass of the rubber component is, for example, preferably more than 1 parts by mass and less than 200 parts by mass.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

Nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

Each rubber composition may further contain fillers generally used in the tire industry, such as silica, calcium carbonate, talc, alumina, clay, aluminum hydroxide, and mica, in addition to the above-mentioned carbon black. These contents are, for example, more than 0.1 part by mass and less than 200 parts by mass with respect to 100 parts by mass of the rubber component.

(b) Softener

The rubber composition may contain oil (including extender oil), liquid rubber, or the like, as a softener. The total content of these is, for example, preferably more than 1.0 parts by mass, more preferably more than 8.0 parts by mass with respect to 100 parts by mass of the rubber component. On the other hand, less than 100 parts by mass is preferable, less than 40 parts by mass is more preferable, and less than 30 parts by mass is further preferable. The oil content also includes the amount of oil contained in rubber (oil spread rubber).

Examples of the oil include mineral oil (generally referred to as process oil), vegetable oil and fat, and a mixture thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, camellia oil, jojoba oil, macadamia nut oil, and tung oil. These may be used alone or in combination of two or more.

Specific examples of process oil (mineral oil) include products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd.

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E,7E)-3,7,11-trimethyl-1,3,6,10-dodecatetraene) and ß-farnesene (7,11-dimethyl-3-methylene-1,6,10-dodecatrien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

As the liquid rubber, for example, products of Kuraray Co., Ltd. and Clay Valley Co., Ltd. can be used.

(b-3) Anti-Aging Agent

Each of the rubber composition preferably contains an anti-aging agent. Content of the anti-aging agent is, for example, more than 1 part by mass and less than 10 parts by mass with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate]methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-4) Stearic Acid

Each of the rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, Kao Corporation, Fuji film Wako Pure Chemical Industries, Ltd., and Chiba Fatty Acid Co., Ltd., etc. can be used.

(b-5) Zinc Oxide

Each of the rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(b-6) Wax

Each of the rubber composition preferably contains wax. Content of the wax is, for example, 0.5 to 20 parts by mass, preferably 1.0 to 15 parts by mass, and more preferably 1.5 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer of ethylene or propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(b-7) Crosslinking Agent and Vulcanization Accelerator

Each of the rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexametdihylene-sodium dithiosulfate dihydrate) manufactured by Flexsys, and KA9188 (1,6-bis (N,N'-dibenzylthiocarbamoyldithio) hexane) manufactured by Lanxess; and organic peroxides such as dicumylperoxide.

Each of the rubber composition preferably contains a vulcanization accelerator. Content of the vulcanization accelerator is, for example, more than 0.3 parts by mass and less than 10.0 parts by mass with respect to 100 parts by mass of the rubber component.

Examples of the Vulcanization Accelerator Include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(b-8) Other

In addition to the above components, each of the rubber composition may further contain additives generally used in the tire industry, such as fatty acid metal salts, carboxylic acid metal salts, organic peroxides, and graphite. Content of these additives is, for example, more than 0.1 part by mass and less than 200 parts by mass with respect to 100 parts by mass of the rubber component.

(2) Rubber Composition for Tread

In the present embodiment, the rubber composition for the tread portion contains a predetermined rubber component and other compounding materials.

(a) Rubber Component

The rubber composition for the tread portion may use rubbers (polymers) generally used for manufacturing tires such as butadiene rubber (BR), styrene-butadiene rubber (SBR), isoprene-based rubber, and nitrile rubber (NBR), as a rubber component. Among these, it is preferable to use styrene-butadiene rubber (SBR) and isoprene-based rubber. In these rubbers, the rubber phases can be phase-separated and entangled with each other, so that the strain inside the rubber can be reduced.

(a-1) SBR

The content of SBR in 100 parts by mass of the rubber component is 1 part by mass or more and less than 100 parts by mass. It is more preferably more than 5 parts by mass, and further preferably more than 15 parts by mass, and more than 25 parts by mass is particularly preferable. On the other hand, it is preferably less than 65 parts by mass, more preferably less than 55 parts by mass, and further preferably less than 45 parts by mass, and less than 35 parts by mass is particularly preferable.

The weight average molecular weight of SBR is, for example, more than 100,000 and less than 2 million. The styrene content of SBR is 5% by mass or more and particularly 8% by mass or more. It is preferably less than 35% by mass, more preferably less than 25% by mass, and further preferably less than 15% by mass. The vinyl bond amount (1,2-bonded butadiene unit amount) of SBR is, for example, more than 5% by mass and less than 70% by mass. The structure identification of SBR (measurement of styrene content and vinyl bond amount) can be performed using, for example, an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR, and these may be used alone or in combination of two or more.

The modified SBR may be any SBR having a functional group that interacts with a filler such as silica. Examples thereof include
  end-modified SBR (end-modified SBR having the above functional group at the terminal) in which at least one end of the SBR is modified with a compound having the above functional group (modifying agent),
  main chain modified SBR having the functional group in the main chain,
  main chain terminal modified SBR having the functional group at the main chain and the terminal (for example, a main chain terminal modified SBR having the above functional group to the main chain and having at least one end modified with the above modifying agent), and
  end-modified SBR which is modified (coupled) with a polyfunctional compound having two or more epoxy groups in the molecule, and into which an epoxy group or hydroxyl group has been introduced, Examples of the functional groups include amino group, amido group, silyl group, alkoxysilyl group, isocyanate group, imino group, imidazole group, urea group, ether group, carbonyl group, oxycarbonyl group, mercapto group, sulfide group, disulfide group, sulfonyl group, sulfinyl group, thiocarbonyl group, ammonium group, imide group, hydrazo group, azo group, diazo group, carboxyl group, nitrile group, pyridyl group, alkoxy group, hydroxyl group, oxy group, and epoxy group. In addition, these functional groups may have a substituent.

Also, as the modified SBR, modified SBR into which the above-mentioned functional groups have been introduced can be used.

As the SBR, for example, SBR manufactured and sold by Sumitomo Chemical Co., Ltd., JSR Corporation, Asahi Kasei Co., Ltd., Nippon Zeon Co., Ltd, etc. can be used. The SBR may be used alone or in combination of two or more.

(a-2) Isoprene-Based Rubber

As the isoprene-based rubber, the above-described natural rubber (NR), isoprene rubber (IR), reformed NR, modified NR, modified IR, etc. can be used. The content (total content) of the isoprene-based rubber is preferably more than 5 parts by mass, more preferably more than 25 parts by mass, further preferably more than 35 parts by mass, and particularly preferably more than 50 parts by mass. On the other hand, the upper limit of the content of isoprene-based rubber is not particularly limited, but is preferably less than 100 parts by mass, more preferably less than 80 parts by mass.

(a-3) BR

The rubber composition for the tread portion may further contain the BR described above. In this case, the content of BR in 100 parts by mass of the rubber component is preferably more than 5 parts by mass. Also, it is preferably less than 100 parts by mass, more preferably less than 30 parts by mass, and further preferably less than 20 parts by mass.

(a-4) Other Rubber Components

Further, the rubber composition for tread portion may contain a rubber (polymer) generally used in the production of tires, such as nitrile rubber (NBR), as another rubber component.

(b) Compounding Materials Other than Rubber Components (b-1) Silica

The rubber composition may contain silica, if necessary. The BET specific surface area of the silica is preferably more than 140 $m^2/g$, more preferably more than 160 $m^2/g$, from the viewpoint of obtaining good durability performance. On the other hand, from the viewpoint of obtaining good rolling resistance at high-speed running, it is preferably less than 250 $m^2/g$, and more preferably less than 220 $m^2/g$. Moreover, the content of the silica with respect to 100 parts by mass of the rubber component is preferably more than 60 parts by mass, more preferably more than 70 parts by mass. On the other hand, it is preferably less than 150 parts by mass, more preferably less than 140 parts by mass, and further preferably less than 130 parts by mass. The above-mentioned BET specific surface area is the value of $N_2SA$ measured by the BET method according to ASTM D3037-93.

Examples of silica include dry silica (anhydrous silica) and wet silica (hydrous silica). Among them, wet silica is preferable because it has large number of silanol groups.

As the silica, for example, products of Evonik, Degussa, Rhodia, Tosoh Silica Co., Ltd., Solvay Japan Co., Ltd., Tokuyama Corporation, etc. can be used.

(b-2) Silane Coupling Agent

Further, the rubber composition for the tread portion preferably contains a silane coupling agent together with silica. The silane coupling agent is not particularly limited. Examples of the silane coupling agent include
  sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis (2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;
  mercapto-based ones such as 3-mercaptopropyltrimethoxysilane, 2-mercaptoethyltriethoxysilane, and NXT and NXT-Z manufactured by Momentive;
  vinyl-based ones such as vinyl triethoxysilane, and vinyl trimethoxysilane;
  amino-based ones such as 3-aminopropyltriethoxysilane and 3-aminopropyltrimethoxysilane;
  glycidoxy-based ones such as γ-glycidoxypropyltriethoxysilane and γ-glycidoxypropyltrimethoxysilane;
  nitro-based ones such as 3-nitropropyltrimethoxysilane, and 3-nitropropyltriethoxysilane; and
  chloro-based ones such as 3-chloropropyltrimethoxysilane and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(b-3) Carbon Black

Further, the rubber composition for the tread portion preferably contains the carbon black shown in the above "(1) Rubber composition for side portions and rubber composition for clinch portion". The content of carbon black is, for example, more than 1 part by mass and less than 200 parts by mass with respect to 100 parts by mass of the rubber component.

In addition to the silica and carbon black described above, fillers commonly used in the tire industry, such as calcium carbonate, talc, alumina, clay, aluminum hydroxide, and mica, may be further contained. These contents are, for example, more than 0.1 parts by mass and less than 200 parts by mass with respect to 100 parts by mass of the rubber component.

(b-4) Softener

In the rubber composition for the tread portion, similarly, the oil (including the extender oil), liquid rubber, and the like, shown in the above "(1) Rubber composition for the side portion and the rubber composition for the clinch portion", are preferably contained as softening agents. The total content of these is preferably more than 5 parts by mass, more preferably more than 10 parts by mass, with respect to 100 parts by mass of the rubber component. On the other hand, it is preferably less than 70 parts by mass, more preferably less than 50 parts by mass, and further preferably less than parts by mass.

(b-5) Resin Component

The rubber composition for tread portion preferably contains a resin component. The resin component may be solid or liquid at room temperature, and specific examples of resin components include styrene resin, coumarone resin, terpene resin, C5 resin, C9 resin, C5C9 resin, and acrylic resin. Two or more kinds of the resin components may be used in combination. The content of the resin component with respect to 100 parts by mass of the rubber component is preferably more than 2 parts by mass and less than 45 parts by mass, and more preferably less than 30 parts by mass.

(Styrene Resin)

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; and α, β-unsaturated carboxylic acids such as maleic anhydride and acid anhydrides thereof.

(Coumarone-Based Resin)

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

(Terpene Resin)

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$, or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, ß-pinene, dipentene, limonene, myrcene, alloocimene, osimene, α-phellandrene, α-terpinene, γ-terpinene, terpinolene, 1,8-cineol, 1,4-cineol, α-terpineol, ß-terpineol, and γ-terpineol.

Examples of the polyterpene include terpene resins such as α-pinene resin, ß-pinene resin, limonene resin, dipentene resin, and ß-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating the above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

(C5 Resin, C9 Resin, C5C9 Resin)

The C5 resin refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The C9 resin refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton, Eastman Chemical, etc. can be used.

The C5C9 resin refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

(Acrylic Resin)

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method (a method described in U.S. Pat. No. 4,414,370 B, JP 84-6207 A, JP 93-58805 B, JP 89-313522 A, U.S. Pat. No. 5,010,166 B, Toa Synthetic Research Annual Report TREND2000 No. 3 p 42-45, and the like) without using polymerization initiators, chain transfer agents, organic solvents, etc. as auxiliary raw materials as much as possible, can be mentioned. In the present disclosure, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd. can be used.

(b-6) Anti-Aging Agent

The rubber composition for the tread portion preferably contains the anti-aging agent shown in the above "(1) Rubber composition for side portions and rubber composition for clinch portion". The content of the anti-aging agent is, for example, more than 1 part by mass and less than 10 parts by mass with respect to 100 parts by mass of the rubber component.

(b-7) Stearic Acid

The rubber composition for the tread portion may also contain stearic acid as described above. The content of stearic acid is, for example, more than 0.5 parts by mass and less than 10.0 parts by mass with respect to 100 parts by mass of the rubber component.

(b-8) Zinc Oxide

The rubber composition for the tread portion may also contain zinc oxide as described above. The content of zinc oxide is, for example, more than 0.5 parts by mass and less than 10 parts by mass with respect to 100 parts by mass of the rubber component.

(b-9) Cross-Linking Agent and Vulcanization Accelerator

The rubber composition for the tread portion preferably contains the above-described cross-linking agent and vulcanization accelerator. The content of the cross-linking agent is, for example, more than 0.1 parts by mass and less than 10.0 parts by mass with respect to 100 parts by mass of the rubber component. The content of the vulcanization accelerator is, for example, more than 0.3 parts by mass and less than 10.0 parts by mass with respect to 100 parts by mass of the rubber component.

(b-10) Other

In addition to the above components, the rubber composition for the tread portion may further contain additives generally used in the tire industry, such as fatty acid metal salts, carboxylic acid metal salts, organic peroxides, and the like. The content of these additives is, for example, more than 0.1 parts by mass and less than 200 parts by mass with respect to 100 parts by mass of the rubber component.

(3) Kneading Each Rubber Composition

The kneading of each rubber composition will be specifically described below.

As described above, the kneading can be performed using, for example, a banbury mixer, a kneader, an open roll, or the like.

The kneading temperature in the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature in the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

3. Tire Manufacturing

The tire of the present disclosure is manufactured by a usual method using an unvulcanized rubber composition obtained through the finish kneading step. That is, the unvulcanized rubber composition is extruded according to each of the shapes of side portion, clinch portion, and tread portion, and is molded together with other tire members by a normal method on a tire molding machine to produce an unvulcanized tire.

Specifically, on the molded drum, the inner liner as a member to ensure the air-tightness of the tire, the carcass as a member to withstand the load, impact and filling air pressure received by the tire, the belt as a member to strongly tighten the carcass to increase the rigidity of the tread, and the like are wound, both ends of the carcass are fixed to both side edges, a bead part as a member for fixing the tire to the rim is arranged, and they are formed into a toroid shape. Then the tread is pasted on the center of the outer circumference, and a sidewall as a member protecting the carcass and resisting bending, is pasted on the radially outside, and an unvulcanized tire is produced.

In the present embodiment, it is preferable to provide with an inclined belt layer that extends at an angle of more than 55° and less than 75° with respect to the tire circumferential direction, as the belt. As a result, the durability of the tire is ensured while the rigidity of the tread can be sufficiently maintained.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

At this time, the tire is formed into a shape that satisfies the above-mentioned (formula 1) and (formula 2) when the tire is installed on a standardized rim and the internal pressure is set to 250 kPa.

Specific tires that can satisfy the above (formula 1) and (formula 2) include tires with size notation of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In the present embodiment, the tires that can satisfy (formula 1) and (formula 2) are preferably applied to pneumatic tires for passenger cars, and satisfying the above formulas can contribute more favorably to solve the problem in the present disclosure of providing a pneumatic tire in which uneven wear of the tread portion is sufficiently suppressed during high-speed running and which has excellent durability performance in addition to sufficiently reduced rolling resistance.

Here, the passenger car tire refers to a tire installed on a vehicle running on four wheels and having a maximum load capacity of 1000 kg or less. Here, the maximum load capacity is the maximum load capacity defined for each tire in the standard system including the standard on which the tire is based. For example, in the case of JATTA standard (Japan Automobile Tire Association standard), it is the maximum load capacity based on load index (LI); in the case of TRA (The Tire and Rim Association, Inc.), it is the maximum value described in "TIRE LOAD LIMITS AT VARIOUS COLD INFRACTION PRESSURES"; and in the case of ETRTO, it is "INFRACTION PRESSURE".

The maximum load capacity is not particularly limited as long as it is 1000 kg or less. However, in general, the tire weight tends to increase as the maximum load capacity increases, and the braking distance also increases due to inertia accordingly. Therefore, the maximum load capacity is preferably 900 kg or less, more preferably 800 kg or less, and further preferably 700 kg or less.

From the viewpoint of the braking distance due to the inertia described above, the tire weight is preferably 20 kg or less, more preferably 15 kg or less, and further preferably 12 kg or less, 10 kg or less, and 8 kg or less. The tire of the present disclosure may be provided with electronic components, and in this case, the tire weight referred to here is the weight of the tire including the weights of the electronic components and the electronic component mounting members. If a sealant, sponge or the like is provided in the lumen, the weight of the tire includes them.

EXAMPLES

Hereinafter, the present disclosure will be described in more specific with reference to Examples.

Experiment 1

In this experiment, 175 size tires were prepared and evaluated.

1. Manufacture of Each Rubber Composition

First, each rubber composition (rubber composition for side portion, rubber composition for clinch portion, rubber composition for tread) was prepared.

(1) Rubber Composition for Side Portions

First, BR and NR are used as rubber components from the above compounding materials, and they were put into a Banbury mixer together with carbon black, oil, stearic acid, zinc oxide, wax, and anti-aging agent, as other compounding materials, and kneading was conducted at 150° C. for 5 minutes to obtain a kneaded product.

Next, sulfur and a vulcanization accelerator were added to the kneaded product obtained above, and the resulting mixture was kneaded at 80° C. for 5 minutes using an open roll to obtain a rubber composition for side portions. At this time, the compounding amounts of carbon black and oil among compounding materials were adjusted so that $E^*(E^*_S)$ of the tire side portion becomes 4.0 MPa and tan δ of the tire side portion becomes 0.090.

(2) Rubber Composition for Clinch Portion

A rubber composition for clinch portion was obtained in the same manner as the above-mentioned rubber composition for side portion. Here, among the compounding materials, the compounding amounts of carbon black and oil were adjusted so as to obtain five types in which $E^*(E^*_C)$ of the clinch portion becomes 6.1 MPa (formulation 1), 7.7 MPa (formulation 2), 8.3 MPa (formulation 3), 2.8 MPa (formulation 4), or 6.7 MPa (formulation 5), respectively.

(3) Rubber Composition for Tread

NR and SBR are used as rubber components from the above compounding materials, and they were put into a Banbury mixer together with carbon black, silica, silane coupling agent, oil, resin (polymer), stearic acid, and zinc oxide, as other compounding materials, and kneading was conducted at 150° C. for 5 minutes to obtain a kneaded product.

Next, sulfur and a vulcanization accelerator were added to the obtained kneaded product, and the mixture was kneaded at 80° C. for 5 minutes using an open roll to obtain a rubber composition for tread portion.

2. Tire Manufacturing

Using each of the obtained rubber composition, a side portion (thickness Ts: 5 mm), a clinch portion, and a tread portion were molded into a predetermined shape, and pasted together with other tire members to form an unvulcanized tire. Then, the unvulcanized tire was press-vulcanized for 10 minutes under the condition of 170° C. to produce each test tire having a size of 175 type (Example 1-1 to Example 1-5 and Comparative example 1-1 to Comparative example 1-5).

3. Parameter Calculation

Thereafter, the outer diameter Dt (mm), the cross-sectional width Wt (mm), the aspect ratio (%), and (Ha−Hb) of each test tire were obtained, and the virtual volume V (mm³) was calculated. The results are shown in Tables 1 and 2.

At the same time, a rubber test piece for viscoelasticity measurement was produced by cutting out from the rubber layer of the clinch portion and the side portion of each test tire in a length 20 mm×width 4 mm×thickness 2 mm so that the tire circumferential direction was the long side. Then, for each rubber test piece, the complex elastic modulus, $E^*_C$, $E^*_S$, were measured under the conditions of 70° C., frequency of 10 Hz, initial strain of 5%, and dynamic strain of 1% using an Eplexor series manufactured by GABO Co., Ltd. The results are shown in Tables 1 and 2. Also, tan δ of the side portion was measured to obtain tan δ×Ts (0.090× 5=0.45).

Then, $(Dt^2 \times \pi/4)/Wt$, $(V+1.5 \times 10^7)/Wt$, $(V+2.0 \times 10^7)/Wt$, $(V+2.5 \times 10^7)/Wt$, 30° C. tan δ×Wt, $(E^*_C-E^*_S)/Wt$ and $(Ha-Hb)/Wt$ were calculated. The results are shown in Tables 1 and 2.

4. Performance Evaluation Test
(1) Evaluation of Uneven Wear

Each test tire was installed on all wheels of a vehicle (domestic FF vehicle, displacement 2000 cc), and after filling air so that the internal pressure becomes 250 kPa, it was run at a speed of 120 km/h on a dry road test course. After running 30 laps, the amounts of wear in the tread center portion and the shoulder portion after running were determined, and the ratio between the two was calculated. The closer the ratio value is to 1, the less uneven wear occurs.

Next, the calculation result in Comparative Examples 1-5 was set to as 100, the results were indexed based on the following formula to relatively evaluate uneven wear resistance performance during high-speed running. A larger value indicates less uneven wear and better resistance to uneven wear.

Uneven wear resistance=[(Calculation result of Comparative Example 1-5)/(Calculation result of test tire)]×100

(2) Evaluation of Durability Performance

After installing each test tire on all wheels of the vehicle (domestic FF vehicle, displacement 2000 cc) and filling it with air so that the internal pressure becomes 250 kPa, a driving 10 laps at a speed of 50 km/h, followed by climbing onto the unevenness provided on the road surface at a speed of 80 km/h was repeated on the test course on a dry road surface in an overloaded state. Thereafter, the lap was performed again at a speed of 50 km/h and then the speed was gradually increased to measure the speed at the time when the driver felt an abnormality.

Next, the result in Comparative example 1-5 was set to as 100, and the durability performance was relatively evaluated by indexing based on the following formula. The larger the value, the better the durability.

Durability=[(Result of test tire)/(Result of Comparative example 1-5)]×100

(3) Comprehensive Evaluation

The evaluation results of (1) and (2) above were totaled to obtain a comprehensive evaluation.

(4) Evaluation Result

The results of each evaluation are shown in Tables 1 and 2.

TABLE 1

| | Example No. | | | | |
|---|---|---|---|---|---|
| | 1-1 | 1-2 | 1-3 | 1-4 | 1-5 |
| SIZE | 175/40R21 | 175/40R21 | 175/40R21 | 175/50R20 | 175/60R19 |
| Formulation for clinch portion | 1 | 2 | 3 | 1 | 1 |
| | (Parameter) | | | | |
| Ha − Hb (mm) | 12 | 22 | 35 | 12 | 12 |
| $E^*_C - E^*_S$ (MPa) | 2.1 | 3.7 | 4.3 | 2.1 | 2.1 |
| Dt (mm) | 671 | 673 | 675 | 685 | 691 |
| V (mm³) | 22647919 | 23279803 | 23518082 | 30349719 | 34192251 |
| Wt (mm) | 174 | 176 | 175 | 183 | 178 |
| Ht (mm) | 69 | 70 | 71 | 89 | 104 |
| Dt − 2 × Ht (mm) | 533 | 533 | 533 | 507 | 483 |
| $(Dt^2 \times \pi/4)/Wt$ | 2032 | 2021 | 2045 | 2014 | 2107 |
| $(V + 1.5 \times 10^7)/Wt$ | 216702 | 217834 | 220438 | 248610 | 276058 |
| $(V + 2.0 \times 10^7)/Wt$ | 245438 | 246243 | 249010 | 275932 | 304147 |
| $(V + 2.5 \times 10^7)/Wt$ | 274174 | 274652 | 277581 | 303255 | 332237 |
| Aspect ratio (%) | 40 | 40 | 41 | 49 | 58 |
| $(E^*_C - E^*_S)/Wt$ | 0.01207 | 0.02102 | 0.02457 | 0.01148 | 0.01180 |
| (Ha − Hb)/Wt | 0.06897 | 0.12500 | 0.20000 | 0.06557 | 0.06742 |
| | (Evaluation result) | | | | |
| Uneven wear resistance | 106 | 115 | 119 | 109 | 114 |
| Durability | 117 | 120 | 124 | 113 | 109 |
| Comprehensive evaluation | 223 | 235 | 243 | 222 | 223 |

TABLE 2

| | Comparative example No. | | | | |
|---|---|---|---|---|---|
| | 1-1 | 1-2 | 1-3 | 1-4 | 1-5 |
| SIZE | 175/80R14 | 175/60R19 | 175/80R14 | 175/80R14 | 175/80R14 |
| Formulation for clinch portion | 4 | 4 | 1 | 2 | 3 |
| | (Parameter) | | | | |
| Ha − Hb (mm) | −21 | −21 | 12 | 22 | 35 |
| $E^*_C - E^*_S$ (MPa) | −1.2 | −1.2 | 2.1 | 3.7 | 4.3 |
| Dt (mm) | 635 | 693 | 636 | 637 | 634 |
| V (mm³) | 38535090 | 34331262 | 38831091 | 38669035 | 37827524 |

TABLE 2-continued

|  | Comparative example No. | | | | |
| --- | --- | --- | --- | --- | --- |
|  | 1-1 | 1-2 | 1-3 | 1-4 | 1-5 |
| Wt (mm) | 177 | 177 | 178 | 176 | 175 |
| Ht(mm) | 140 | 105 | 140 | 141 | 139 |
| Dt − 2 × Ht(mm) | 355 | 483 | 356 | 355 | 356 |
| (Dt$^2$ × π/4)/Wt | 1789 | 2131 | 1785 | 1811 | 1804 |
| (V + 1.5 × 10$^7$)/Wt | 302458 | 278708 | 302422 | 304938 | 301872 |
| (V + 2.0 × 10$^7$)/Wt | 330707 | 306956 | 330512 | 333347 | 330443 |
| (V + 2.5 × 10$^7$)/Wt | 358955 | 335205 | 358602 | 361756 | 359014 |
| Aspect ratio (%) | 79 | 59 | 79 | 80 | 79 |
| (E*$_C$ − E*$_S$)/Wt | −0.00678 | −0.00678 | 0.01180 | 0.02102 | 0.02457 |
| (Ha − Hb)/Wt | −0.11864 | −0.11864 | 0.06742 | 0.12500 | 0.20000 |
|  | (Evaluation result) | | | | |
| Uneven wear resistance | 89 | 91 | 93 | 96 | 100 |
| Durability | 79 | 82 | 91 | 94 | 100 |
| Comprehensive evaluation | 168 | 173 | 184 | 190 | 200 |

Experiment 2

In this experiment, 195 size tires were prepared and evaluated.

After producing the test tires of Examples 2-1 to 2-5 and Comparative examples 2-1 to 2-5 shown in Tables 3 and 4 in the same manner as in Experiment 1, each parameter was calculated by performing the same procedure. Then, in the same manner, a performance evaluation test was conducted and evaluated. In this experiment, the result in Comparative example 2-5 was set as 100 for evaluation. The results of each evaluation are shown in Tables 3 and 4.

TABLE 3

|  | Example No. | | | | |
| --- | --- | --- | --- | --- | --- |
|  | 2-1 | 2-2 | 2.3 | 2-4 | 2-5 |
| SIZE | 195/40R20 | 195/40R20 | 195/40R20 | 195/50R19 | 195/60R18 |
| Formulation for clinch portion | 1 | 2 | 3 | 1 | 1 |
|  | (Parameter) | | | | |
| Ha − Hb (mm) | 12 | 22 | 35 | 12 | 12 |
| E*$_C$ − E*$_S$ (MPa) | 2.1 | 3.7 | 4.3 | 2.1 | 2.1 |
| Dt (mm) | 664 | 662 | 665 | 680 | 690 |
| V (mm$^3$) | 28719183 | 28585634 | 29087378 | 36682357 | 41835961 |
| Wt (mm) | 200 | 202 | 200 | 203 | 200 |
| Ht(mm) | 78 | 77 | 79 | 99 | 116 |
| Dt − 2 × Ht(mm) | 508 | 508 | 507 | 482 | 458 |
| (Dt$^2$ × π/4)/Wt | 1731 | 1704 | 1737 | 1789 | 1870 |
| (V + 1.5 × 10$^7$)/Wt | 218596 | 215770 | 220437 | 254593 | 284180 |
| (V + 2.0 × 10$^7$)/Wt | 243596 | 240523 | 245437 | 279223 | 309180 |
| (V + 2.5 × 10$^7$)/Wt | 268596 | 265275 | 270437 | 303854 | 334180 |
| Aspect ratio (%) | 39 | 38 | 40 | 49 | 58 |
| (E*$_C$ − E*$_S$)/Wt | 0.01050 | 0.01832 | 0.02150 | 0.01034 | 0.01050 |
| (Ha − Hb)/Wt | 0.06000 | 0.10891 | 0.17500 | 0.05911 | 0.06000 |
|  | (Evaluation result) | | | | |
| Uneven wear resistance | 108 | 116 | 121 | 110 | 116 |
| Durability | 116 | 120 | 125 | 114 | 110 |
| Comprehensive evaluation | 224 | 236 | 246 | 224 | 226 |

TABLE 4

|  | Comparative example No. | | | | |
| --- | --- | --- | --- | --- | --- |
|  | 2-1 | 2-2 | 2-3 | 2-4 | 2-5 |
| SIZE | 195/65R17 | 195/40R20 | 195/65R17 | 195/65R17 | 195/65R17 |
| Formulation for clinch portion | 4 | 4 | 1 | 2 | 3 |
|  | (Parameter) | | | | |
| Ha − Hb (mm) | −21 | −21 | 12 | 22 | 35 |
| E*$_C$ − E*$_S$ (MPa) | −1.2 | −1.2 | 2.1 | 3.7 | 4.3 |
| Dt (mm) | 685 | 663 | 687 | 686 | 684 |
| V (mm$^3$) | 44971685 | 28813525 | 45631809 | 44829249 | 44175819 |
| Wt (mm) | 202 | 201 | 203 | 201 | 200 |
| Ht(mm) | 127 | 78 | 128 | 127 | 126 |
| Dt − 2 × Ht(mm) | 431 | 507 | 431 | 432 | 432 |

TABLE 4-continued

|  | Comparative example No. | | | | |
|---|---|---|---|---|---|
|  | 2-1 | 2-2 | 2-3 | 2-4 | 2-5 |
| $(Dt^2 \times \pi/4)/Wt$ | 1824 | 1718 | 1826 | 1839 | 1837 |
| $(V + 1.5 \times 10^7)/Wt$ | 296890 | 217978 | 298679 | 297658 | 295879 |
| $(V + 2.0 \times 10^7)/Wt$ | 321642 | 242853 | 323309 | 322534 | 320879 |
| $(V + 2.5 \times 10^7)/Wt$ | 346394 | 267729 | 347940 | 347409 | 345879 |
| Aspect ratio (%) | 63 | 39 | 63 | 63 | 63 |
| $(E^*_C - E^*_S)/Wt$ | −0.00594 | −0.00597 | 0.01034 | 0.01841 | 0.02150 |
| $(Ha - Hb)/Wt$ | −0.10396 | −0.10448 | 0.05911 | 0.10945 | 0.17500 |
| (Evaluation result) | | | | | |
| Uneven wear resistance | 88 | 91 | 92 | 95 | 100 |
| Durability | 80 | 82 | 92 | 93 | 100 |
| Comprehensive evaluation | 168 | 173 | 184 | 188 | 200 |

Experiment 3

In this experiment, 225 size tires were prepared and evaluated.

After producing the test tires of Examples 3-1 to 3-5 and Comparative examples 3-1 to 3-5 shown in Tables 5 and 6 in the same manner as in Experiment 1, each parameter was calculated by performing the same procedure. Then, in the same manner, a performance evaluation test was conducted and evaluated. In this experiment, the result in Comparative example 3-5 was set as 100 for evaluation. The results of each evaluation are shown in Tables 5 and 6.

TABLE 5

|  | Example No. | | | | |
|---|---|---|---|---|---|
|  | 3-1 | 3.2 | 3-3 | 3-4 | 3-5 |
| SIZE | 225/35R22 | 225/35R22 | 225/35R22 | 225/50R20 | 225/40R21 |
| Formulation for clinch portion | 1 | 2 | 3 | 1 | 1 |
| (Parameter) | | | | | |
| Ha − Hb (mm) | 12 | 22 | 35 | 12 | 12 |
| $E^*_C - E^*_S$ (MPa) | 2.1 | 3.7 | 4.3 | 2.1 | 2.1 |
| Dt (mm) | 716 | 719 | 717 | 735 | 714 |
| V (mm$^3$) | 36203610 | 36616393 | 36418787 | 52265389 | 40755756 |
| Wt (mm) | 229 | 228 | 230 | 235 | 231 |
| Ht(mm) | 79 | 80 | 79 | 114 | 90 |
| Dt − 2 × Ht(mm) | 558 | 559 | 559 | 507 | 534 |
| $(Dt^2 \times \pi/4)/Wt$ | 1758 | 1781 | 1755 | 1805 | 1733 |
| $(V + 1.5 \times 10^7)/Wt$ | 223597 | 226388 | 223560 | 286236 | 241367 |
| $(V + 2.0 \times 10^7)/Wt$ | 245431 | 248318 | 245299 | 307512 | 263012 |
| $(V + 2.5 \times 10^7)/Wt$ | 267265 | 270247 | 267038 | 328789 | 284657 |
| Aspect ratio (%) | 34 | 35 | 34 | 49 | 39 |
| $(E^*_C - E^*_S)/Wt$ | 0.00917 | 0.01623 | 0.01870 | 0.00894 | 0.00909 |
| $(Ha - Hb)/Wt$ | 0.05240 | 0.09649 | 0.15217 | 0.05106 | 0.05195 |
| (Evaluation result) | | | | | |
| Uneven wear resistance | 109 | 117 | 122 | 113 | 119 |
| Durability | 115 | 120 | 124 | 115 | 111 |
| Comprehensive evaluation | 224 | 237 | 246 | 228 | 230 |

TABLE 6

|  | Comparative example No. | | | | |
|---|---|---|---|---|---|
|  | 3-1 | 3-2 | 3-3 | 3-4 | 3-5 |
| SIZE | 225/60R20 | 225/50R20 | 225/60R20 | 225/60R20 | 225/60R20 |
| Formulation for clinch portion | 4 | 4 | 1 | 2 | 3 |
| (Parameter) | | | | | |
| Ha − Hb (mm) | −21 | −21 | 12 | 22 | 35 |
| $E^*_C - E^*_S$ (MPa) | −1.2 | −1.2 | 2.1 | 3.7 | 4.3 |
| Dt (mm) | 776 | 733 | 777 | 778 | 780 |
| V (mm$^3$) | 61890670 | 51503396 | 62080258 | 61904251 | 62184635 |
| Wt (mm) | 229 | 234 | 228 | 227 | 226 |
| Ht(mm) | 134 | 113 | 135 | 135 | 136 |
| Dt − 2 × Ht(mm) | 508 | 507 | 507 | 508 | 508 |
| $(Dt^2 \times \pi/4)/Wt$ | 2065 | 1803 | 2080 | 2094 | 2114 |
| $(V + 1.5 \times 10^7)/Wt$ | 335767 | 284203 | 338071 | 338785 | 341525 |
| $(V + 2.0 \times 10^7)/Wt$ | 357601 | 305570 | 360001 | 360812 | 363649 |

TABLE 6-continued

| | Comparative example No. | | | | |
|---|---|---|---|---|---|
| | 3-1 | 3-2 | 3-3 | 3-4 | 3-5 |
| $(V + 2.5 \times 10^7)/Wt$ | 379435 | 326938 | 381931 | 382838 | 385773 |
| Aspect ratio (%) | 59 | 48 | 59 | 59 | 60 |
| $(E^*_C - E^*_S)/Wt$ | −0.00524 | −0.00513 | 0.00921 | 0.01630 | 0.01903 |
| $(Ha - Hb)/Wt$ | −0.09170 | −0.08974 | 0.05263 | 0.09692 | 0.15487 |
| | (Evaluation result) | | | | |
| Uneven wear resistance | 87 | 90 | 92 | 94 | 100 |
| Durability | 81 | 83 | 91 | 94 | 100 |
| Comprehensive evaluation | 168 | 173 | 183 | 188 | 200 |

Summary of Experiments 1 to 3

From the results of Experiments 1 to 3 (Tables 1 to 6), for tires of any size, 175 size, 195 size, 225 size, it turns out that it is possible to provide a pneumatic tire in which uneven wear of the tread portion during high-speed running is sufficiently suppressed, and which has excellent durability performance, when Ha>Hb, $E^*_C > E^*_S$, and the above (formula 1) and (formula 2) are satisfied.

Then, it turns out that, by satisfying each of the requirements specified in claim 2 and thereafter, it is possible to provide a tire with further improved uneven wear resistance and durability of the tread portion during high-speed running.

On the other hand, it turns out that when any of above-mentioned Ha>Hb, $E^*_C > E^*_S$, and (formula 1) and (formula 2) is not satisfied, the uneven wear during high-speed running is not sufficiently suppressed and the excellent durability performance is not sufficiently achieved.

Experiment 4

Next, three types of tires (Examples 4-1 to 4-3), in which the relationship between the virtual volume V and the cross-sectional width Wt did not differ significantly, were produced with the same formulation and were evaluated in the same manner. Here, in addition to the above-mentioned evaluation of uneven wear resistance and durability performance, rolling resistance was also evaluated.

Specifically, each test tire was installed on all wheels of the vehicle (domestic FF vehicle, displacement 2000 cc), filled with air so that the internal pressure became 250 kPa, and then the tire was run on a dry road surface test course. After making 10 km laps at a speed of 100 km/h, the accelerator was released, and the distance from when the accelerator was turned off until the vehicle stopped was measured as the rolling resistance during high-speed running.

Then, the results in Example 4-3 were set to as 100, and indexed based on the following formula to relatively evaluate the rolling resistance during high-speed running. The larger the value, the longer the distance from when the accelerator is released until the vehicle stops, the smaller the rolling resistance in a steady state, and the better the fuel efficiency. Table 7 shows the evaluation results.

Rolling resistance=[(Measurement result of test tire)/(Measurement result of Example 4-3)]×100

Then, as in Experiments 1 to 3, each evaluation result was totaled to obtain a comprehensive evaluation. Table 7 shows the results of each evaluation.

TABLE 7

| | Example No. | | |
|---|---|---|---|
| | 4-1 | 4-2 | 4-3 |
| SIZE | 175/55R18 | 195/50R19 | 225/45R20 |
| Formulation for clinch portion | 5 | 5 | 5 |
| | (Parameter) | | |
| Ha − Hb (mm) | 23 | 23 | 23 |
| $E^*_C - E^*_S$ (MPa) | 2.7 | 2.7 | 2.7 |
| Dt (mm) | 648 | 680 | 711 |
| V (mm³) | 30132749 | 35836776 | 43355989 |
| Wt (mm) | 181 | 200 | 224 |
| Ht (mm) | 96 | 98 | 101 |
| Dt − 2 × Ht (mm) | 456 | 484 | 509 |
| $(Dt^2 \times \pi/4)/Wt$ | 1822 | 1816 | 1772 |
| $(V + 1.5 \times 10^7)/Wt$ | 249352 | 254184 | 260518 |
| $(V + 2.0 \times 10^7)/Wt$ | 276977 | 279184 | 282839 |
| $(V + 2.5 \times 10^7)/Wt$ | 304601 | 304184 | 305161 |
| Aspect ratio (%) | 53 | 49 | 45 |
| $(E^*_C - E^*_S)/Wt$ | 0.01492 | 0.01350 | 0.01205 |
| $(Ha - Hb)/Wt$ | 0.12707 | 0.11500 | 0.10268 |
| | (Evaluation result) | | |
| Uneven wear resistance | 119 | 108 | 100 |
| Durability | 103 | 101 | 100 |
| Rolling resistance | 112 | 105 | 100 |
| Comprehensive evaluation | 334 | 314 | 300 |

Table 7 shows that, when there is no large difference in the relationship between the virtual volume V and the cross-sectional width Wt, the uneven wear resistance performance during high-speed running and durability performance are further improved, and remarkable effects are exhibited, as the cross-sectional width Wt becomes smaller as from less than 205 mm to less than 200 mm, and as the aspect ratio increases.

Although the present disclosure has been described above based on the embodiments, the present disclosure is not limited to the above embodiments. Various modifications can be made to the above embodiments within the same and equal range as the present disclosure.

The Present Disclosure (1) is;
a pneumatic tire having a side portion and a clinch portion, wherein,
Ha>Hb, where, in the meridian cross section, the distance from the bead base line to the width direction outside portion of the clinch portion at the joint surface between the side portion and the clinch portion is Ha (mm), and the distance to the width direction inside portion is Hb (mm);
$E^*_S < E^*_C$, where, measured under the conditions of 70° C., frequency of 10 Hz, initial strain of 5%, and dynamic strain rate of 1%, the complex elastic modulus of the side portion is $E^*_S$ (MPa), and the complex elastic modulus of the clinch portion is $E^*_C$ (MPa); and
the tire satisfies following (formula 1) and (formula 2):

$$1600 \le (Dt^2 \times \pi/4)/Wt \le 2827.4 \quad \text{(formula 1)}$$

$$[(V+1.5\times10^7)/Wt] \le 2.88\times10^5 \quad \text{(formula 2)},$$

where the cross-sectional width of the tire is Wt (mm), the outer diameter is Dt (mm), and the volume of the space occupied by the tire is the virtual volume V (mm³), when the tire is installed on a standardized rim and the internal pressure is 250 kPa.

The present disclosure (2) is the pneumatic tire according to the present disclosure (1), wherein the following (formula 3) is satisfied.

$$[(V+2.0\times10^7)/Wt] \le 2.88\times10^5 \quad \text{(formula 3)}$$

The present disclosure (3) is the pneumatic tire according to the present disclosure (2), wherein the following (formula 4) is satisfied.

$$[(V+2.5\times10^7)/Wt] \le 2.88\times10^5 \quad \text{(formula 4)}$$

The present disclosure (4) is the pneumatic tire of any combination of the present disclosures (1) to (3), wherein, when the outer diameter of the tire is Dt (mm) and the cross-sectional height of the tire is Ht (mm) when the tire is installed on a standardized rim and the internal pressure is 250 kPa, (Dt−2×Ht) is 470 (mm) or more.

The present disclosure (5) is the pneumatic tire of any combination of the present disclosures (1) to (4), which the loss tangent (tan δ) of the side portion measured under the conditions of 70° C., frequency of 10 Hz, initial strain of 5% and dynamic strain rate of 1% is 0.095 or less.

The present disclosure (6) is the pneumatic tire according to the present disclosure (5), wherein the tan δ is 0.090 or less.

The present disclosure (7) is the pneumatic tire of any combination of the present disclosures (1) to (6), which has an aspect ratio of 40% or more.

The present disclosure (8) is the pneumatic tire according to the present disclosure (7), which has an aspect ratio of 45% or more.

The present disclosure (9) is the pneumatic tire according to the present disclosure (8), which has an aspect ratio of 47.5% or more.

The present disclosure (10) is the pneumatic tire according to the present disclosure (9), which has an aspect ratio of 50% or more.

The present disclosure (11) is the pneumatic tire of any combination of the present disclosures (1) to (10), wherein the following (formula 5) is satisfied.

$$(E^*_C - E^*_S)/Wt > 0.04\times10^{-1} \quad \text{(formula 5)}$$

The present disclosure (12) is the pneumatic tire according to the present disclosure (11), wherein the following (formula 6) is satisfied.

$$(E^*_C - E^*_S)/Wt > 0.10\times10^{-1} \quad \text{(formula 6)}$$

The present disclosure (13) is the pneumatic tire of any combination of the present disclosures (1) to (12), wherein $E^*_C$ is 6.1 MPa or more and 8.3 MPa or less.

The present disclosure (14) is the pneumatic tire of any combination of the present disclosures (1) to (13), wherein the following (formula 7) is satisfied.

$$(Ha-Hb)/Wt > 0.04 \quad \text{(formula 7)}$$

The present disclosure (15) is the pneumatic tire according to the present disclosure (14), wherein the following (formula 8) is satisfied.

$$(Ha-Hb)/Wt > 0.10 \quad \text{(formula 8)}$$

The present disclosure (16) is the pneumatic tire of any combination of the present disclosures (1) to (15), wherein a plurality of circumferential grooves is formed in the tread portion, and the total cross-sectional area of the plurality of circumferential grooves is 10 to 30% of the cross-sectional area of the tread portion.

The present disclosure (17) is the pneumatic tire of any combination of the present disclosures (1) to (16), wherein a plurality of lateral grooves extending in the tire axial direction is formed in the tread portion, and the total volume of the plurality of lateral grooves is 2.0 to 5.0% of the volume of the tread portion.

The present disclosure (18) is the pneumatic tire of any combination of the present disclosures (1) to (17), wherein, the loss tangent (tan δ) of the side portion measured under the conditions of 70° C., frequency of 10 Hz, initial strain of 5% and dynamic strain rate of 1% and the thickness Ts (mm) of the side portion measured at the maximum width position satisfy the following (formula 9)

$$\tan \delta \times Ts > 0.40 \quad \text{(formula 9)}$$

The present disclosure (19) is the pneumatic tire according to the present disclosure (18), wherein the following (formula 10) is satisfied.

$$\tan \delta \times Ts > 0.45 \quad \text{(formula 10)}$$

The present disclosure (20) is the pneumatic tire of any combination of the present disclosures (1) to (19), wherein Dt is less than 685 (mm), where Dt (mm) is the outer diameter of the tire when the tire is installed on a standardized rim and the internal pressure is 250 kPa.

The present disclosure (21) is the pneumatic tire of any combination of the present disclosures (1) to (20), wherein the cross-sectional width Wt (mm) is less than 205 mm.

The present disclosure (22) is the pneumatic tire according to the present disclosure (21), wherein the cross-sectional width Wt (mm) is less than 200 mm.

The present disclosure (23) is the pneumatic tire of any combination of the present disclosures (1) to (22), which is a pneumatic tire for a passenger car.

DESCRIPTION OF THE REFERENCE SIGNS

1 Tire
2 Side portion
3 Clinch portion
4 Bead core
5 Carcass ply
6 Bead apex
7 Inner liner

What is claimed is:

1. A pneumatic tire comprising:
a side portion and a clinch portion, wherein,
Ha>Hb, where, in a meridian cross section, a distance from a bead base line to a width direction outside portion of the clinch portion at a joint surface between the side portion and the clinch portion is Ha (mm), and a distance from the bead base line to a width direction inside portion of the clinch portion at the joint surface between a radially innermost portion of the side portion and the clinch portion is Hb (mm);
$E^*_S < E^*_C$, where, measured under conditions of 70° C., a frequency of 10 Hz, an initial strain of 5%, and a dynamic strain rate of 1%, a complex elastic modulus of the side portion is $E^*_S$ (MPa), and a complex elastic modulus of the clinch portion is $E^*_C$ (MPa); and
the tire satisfies following (formula 1) and (formula 2):

$$1600 \leq (Dt^2 \times \pi / 4)/Wt \leq 2827.4 \quad \text{(formula 1)}$$

$$[(V+1.5\times10^7)/Wt] \leq 2.88\times10^5 \quad \text{(formula 2)},$$

where a cross-sectional width of the tire is Wt (mm), an outer diameter is Dt (mm), and a volume of space occupied by the tire is a virtual volume V (mm³), when the tire is installed on a standardized rim and an internal pressure is 250 kPa,
Ha−Hb is 35 mm or more,
$(E^*_C - E^*_S)/Wt$ is 0.015 or more,
a plurality of lateral grooves extending in a tire axial direction are formed in a tread portion of the tire, and a total volume of the plurality of lateral grooves is 2.0 to 5.0% of a volume of the tread portion,
the pneumatic tire has an aspect ratio of 41% or less, and the cross-sectional width Wt (mm) is 228 mm or more.

2. A pneumatic tire comprising:
a side portion and a clinch portion, wherein,
Ha>Hb, where, in a meridian cross section, a distance from a bead base line to a width direction outside portion of the clinch portion at a joint surface between the side portion and the clinch portion is Ha (mm), and a distance from the bead base line to a width direction inside portion of the clinch portion at the joint surface between a radially innermost portion of the side portion and the clinch portion is Hb (mm);
$E^*_S < E^*_C$, where, measured under conditions of 70° C., a frequency of 10 Hz, an initial strain of 5%, and a dynamic strain rate of 1%, a complex elastic modulus of the side portion is $E^*_S$ (MPa), and a complex elastic modulus of the clinch portion is $E^*_C$ (MPa); and
the tire satisfies following (formula 1) and (formula 2):

$$1600 \leq (Dt^2 \times \pi / 4)/Wt \leq 2827.4 \quad \text{(formula 1)}$$

$$[(V+1.5\times10^7)/Wt] \leq 2.88\times10^5 \quad \text{(formula 2)},$$

where a cross-sectional width of the tire is Wt (mm), an outer diameter is Dt (mm), and a volume of space occupied by the tire is a virtual volume V (mm³), when the tire is installed on a standardized rim and an internal pressure is 250 kPa,
Ha−Hb is 35 mm or more,
a plurality of lateral grooves extending in a tire axial direction are formed in a tread portion of the tire, and a total volume of the plurality of lateral grooves is 2.0 to 5.0% of a volume of the tread portion,
the pneumatic tire has an aspect ratio of 41% or less, and the cross-sectional width Wt (mm) is 228 mm or more.

3. The pneumatic tire according to claim 2, wherein, when the outer diameter of the tire is Dt (mm) and a cross-sectional height of the tire is Ht (mm) when the tire is installed on the standardized rim and the internal pressure is 250 kPa, (Dt−2×Ht) is 470 (mm) or more.

4. The pneumatic tire according to claim 2, which has an aspect ratio of 40% or more.

5. The pneumatic tire according to claim 2, wherein $E^*_C$ is 6.1 MPa or more and 8.3 MPa or less.

6. The pneumatic tire according to claim 2, wherein a plurality of circumferential grooves are formed in a tread portion of the tire, and a total cross-sectional area of the plurality of circumferential grooves is 10 to 30% of a cross-sectional area of the tread portion.

7. The pneumatic tire according to claim 2, wherein Dt is less than 685 (mm), where Dt (mm) is the outer diameter of the tire when the tire is installed on the standardized rim and the internal pressure is 250 kPa.

8. The pneumatic tire according to claim 2, which is a pneumatic tire for a passenger car.

9. The pneumatic tire according to claim 2, wherein the following (formula 3) is satisfied:

$$[(V+2.0\times10^7)/Wt] \leq 2.88\times10^5 \quad \text{(formula 3)}.$$

10. The pneumatic tire according to claim 9, wherein the following (formula 4) is satisfied:

$$[(V+2.5\times10^7)/Wt] \leq 2.88\times10^5 \quad \text{(formula 4)}.$$

11. The pneumatic tire according to claim 2, which a loss tangent (tan δ) of the side portion measured under the conditions of 70° C., frequency of 10 Hz, initial strain of 5% and dynamic strain rate of 1% is 0.095 or less.

12. The pneumatic tire according claim 11, wherein the tan δ is 0.090 or less.

13. The pneumatic tire according to claim 2, wherein the following (formula 5) is satisfied:

$$(E^*_C - E^*_S)/Wt > 0.04\times10^{-1} \quad \text{(formula 5)}.$$

14. The pneumatic tire according to claim 13, wherein the following (formula 6) is satisfied:

$$(E^*_C - E^*_S)/Wt > 0.10\times10^{-1} \quad \text{(formula 6)}.$$

15. The pneumatic tire according to claim 2, wherein the following (formula 7) is satisfied:

$$(Ha - Hb)/Wt > 0.04 \quad \text{(formula 7)}.$$

16. The pneumatic tire according to claim 15, wherein the following (formula 8) is satisfied:

$$(Ha - Hb)/Wt > 0.10 \quad \text{(formula 8)}.$$

17. The pneumatic tire according to claim 2, wherein, a loss tangent (tan δ) of the side portion measured under the conditions of 70° C., frequency of 10 Hz, initial strain of 5% and dynamic strain rate of 1% and a thickness Ts (mm) of the side portion measured at a maximum width position satisfy the following (formula 9):

$$\tan \delta \times Ts > 0.40 \quad \text{(formula 9)}.$$

18. The pneumatic tire according to claim 17, wherein the following (formula 10) is satisfied:

$$\tan \delta \times Ts > 0.45 \quad \text{(formula 10)}.$$

* * * * *